(12) United States Patent
Remson

(10) Patent No.: US 7,352,158 B2
(45) Date of Patent: Apr. 1, 2008

(54) SEPIC SYNCHRONOUS RECTIFICATION

(75) Inventor: Joseph D. Remson, Scottsdale, AZ (US)

(73) Assignee: Mobility Electronics, Inc., Scottsdale, AZ (US)

( * ) Notice: Subject to any disclaimer, the term of this patent is extended or adjusted under 35 U.S.C. 154(b) by 388 days.

(21) Appl. No.: 11/123,745

(22) Filed: May 6, 2005

(65) Prior Publication Data
US 2006/0250826 A1 Nov. 9, 2006

(51) Int. Cl.
G05F 1/10 (2006.01)
G05F 1/40 (2006.01)

(52) U.S. Cl. .................. 323/222; 323/282

(58) Field of Classification Search .......... 363/16, 363/20, 21.01, 21.06, 21.12, 56.01; 323/222, 323/268, 271, 282
See application file for complete search history.

(56) References Cited

U.S. PATENT DOCUMENTS 5,115,185 A * 5/1992 Fraidlin et al. ............ 323/207
6,151,233 A 11/2000 Kondo
6,465,991 B1 * 10/2002 Chang ...................... 323/222
6,495,993 B2 * 12/2002 Eagar ....................... 323/271
6,690,122 B2 * 2/2004 Weirich .................... 315/307
7,023,714 B2 * 4/2006 Ceruti et al. ............. 363/56.12
2003/0222629 A1 12/2003 Inoue et al.
2004/0095110 A1 5/2004 Kemahan et al.

FOREIGN PATENT DOCUMENTS

DE 102 55 357 A1 6/2004

OTHER PUBLICATIONS

Maksimovic, Dragan, A General Approach to Synthesis and Analysis of Quasi-Resonant Converters IEEE Transactions on Power Electronics, vol. 6 No. 1, Jan. 1991; pp. 127-140.
EPO Search Report and Written Opinion.

* cited by examiner

Primary Examiner—Matthew V. Nguyen
(74) Attorney, Agent, or Firm—Jackson Walker, LLP; Robert C. Klinger

(57) ABSTRACT

A SEPIC converter having synchronous rectification, accommodating changes in the converter duty cycle, and the ringing conditions when the converter changes operation from a continuous mode to a discontinuous mode, and back. Conductive losses are significantly reduced.

6 Claims, 2 Drawing Sheets

SEPIC SYNCHRONOUS RECTIFICATION

FIELD OF THE INVENTION

The present invention is generally related to power converters, and more particularly to SEPIC converters.

BACKGROUND OF THE INVENTION

Technical issues in applying synchronous rectification to a SEPIC converter include accommodating a changing duty cycle and the ringing conditions when the converter changes operation from continuous mode to discontinuous mode and back. In particular, the frequency of the ring decreases as the load decreases, and there is a decrease in the duty cycle that affects the synchronous rectification.

SUMMARY OF THE INVENTION

The present invention achieves technical advantages as a SEPIC converter having synchronous rectification. The converter accommodates changes in the converter duty cycle, and the ringing conditions when the converter changes operation from a continuous mode to a discontinuous mode, and back. Conductive losses are significantly reduced.

DETAILED DESCRIPTION OF THE PREFERRED EMBODIMENT

Figure 1:
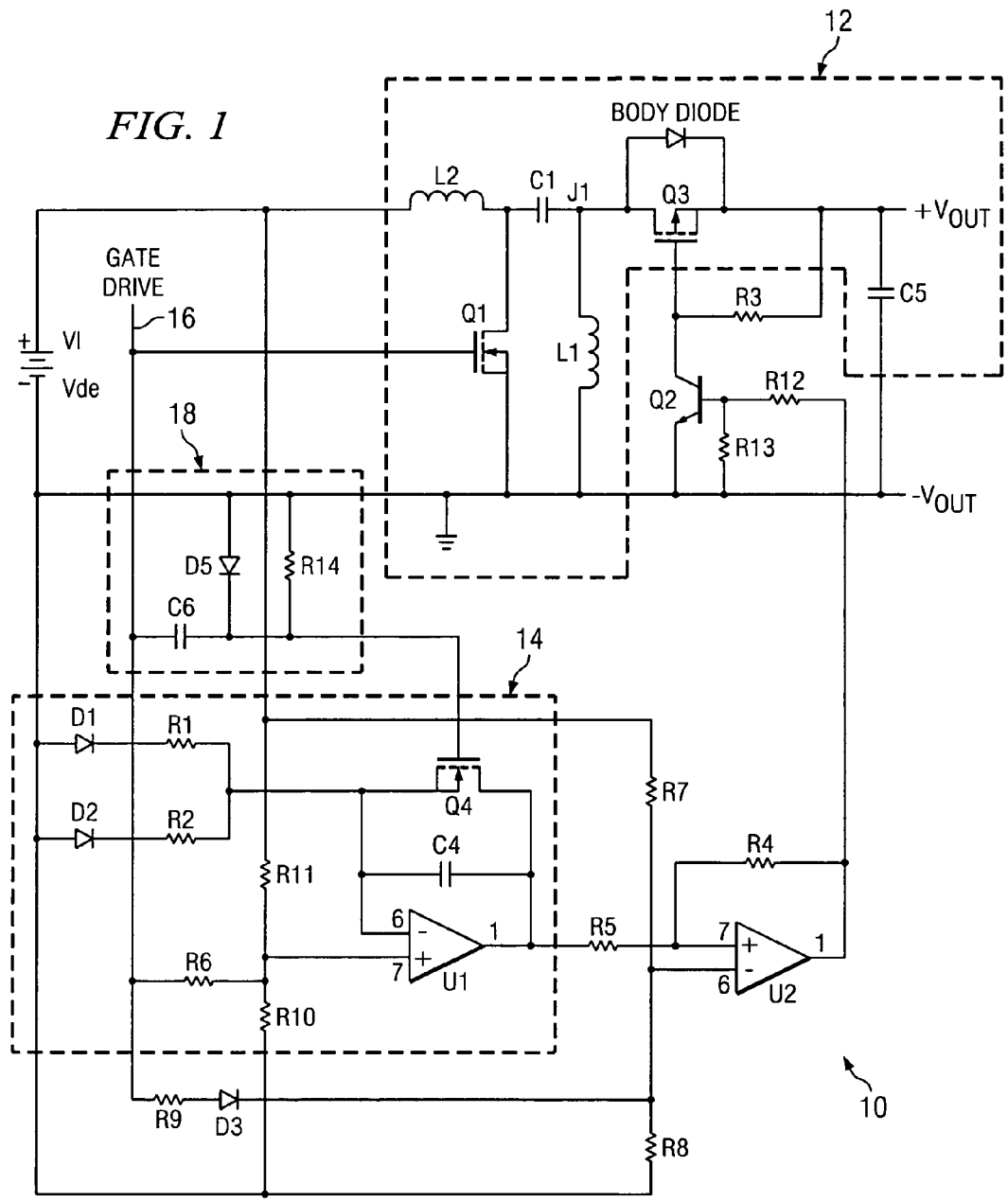
FIG. 1 is an electrical schematic of one embodiment of the invention.
Figure 2:
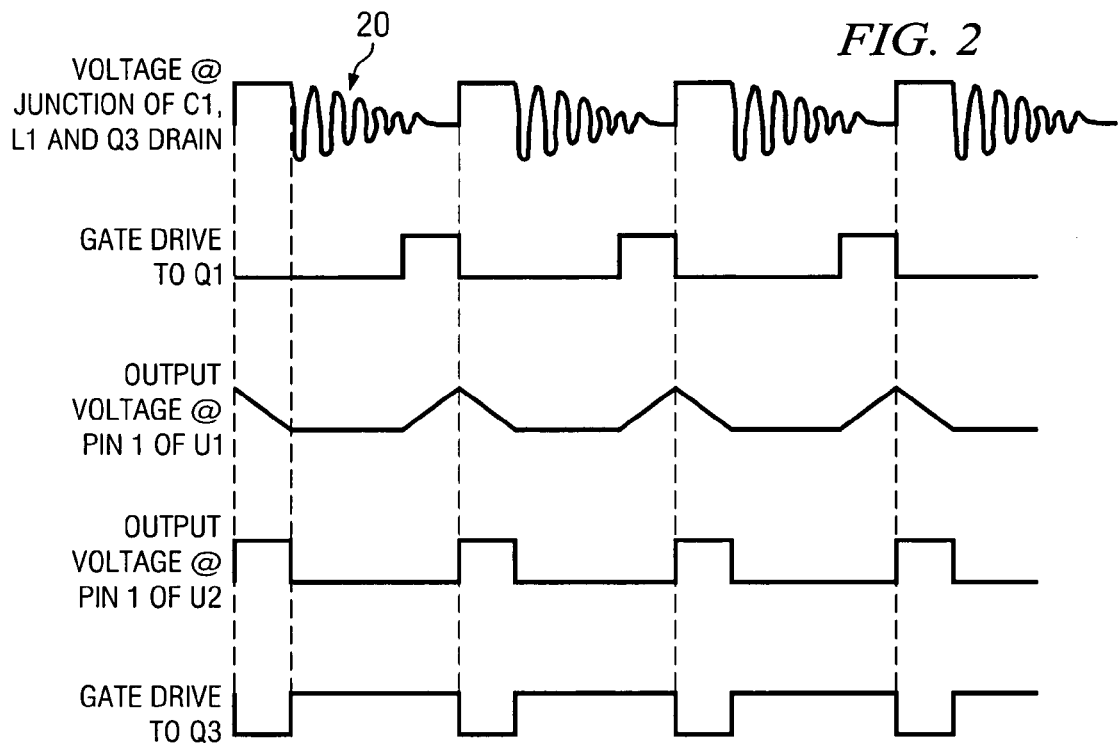
FIG. 2 is a waveform diagram showing voltages at various nodes of the schematic of FIG. 1 with a light load.
Figure 3:
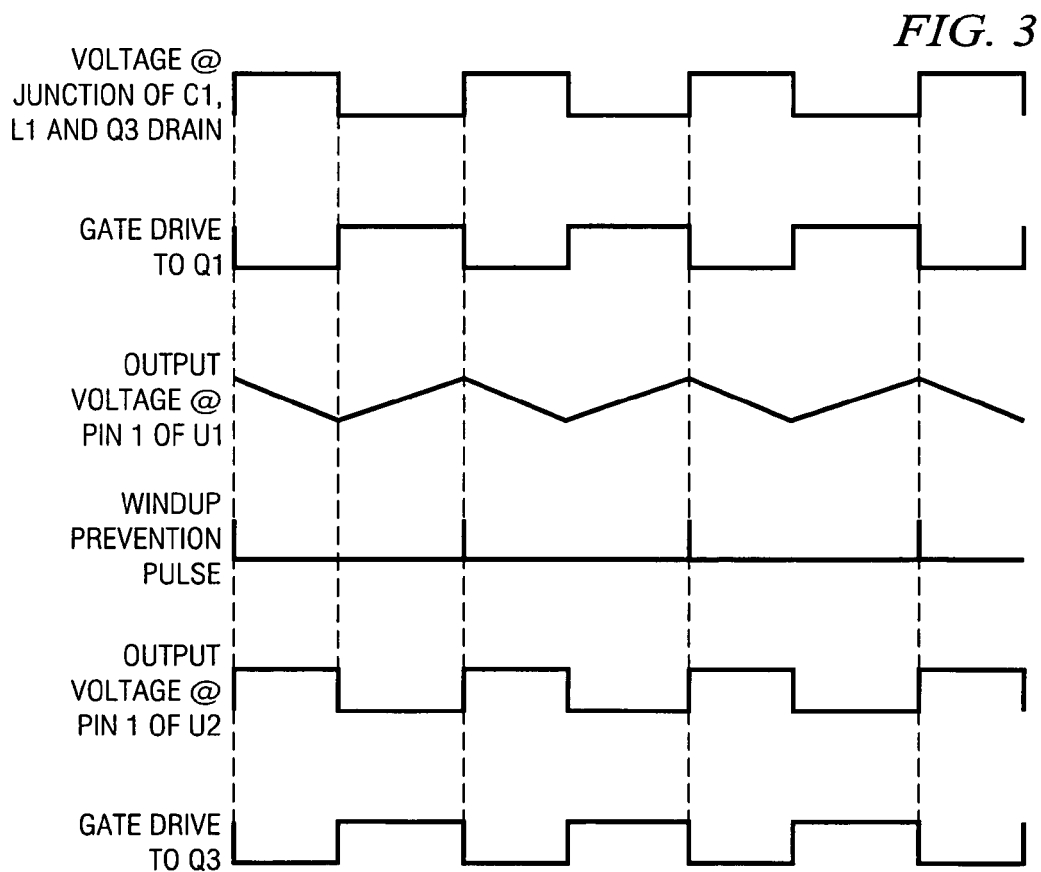
FIG. 3 is a waveform diagram showing voltages at various nodes of the schematic of FIG. 1 with a heavy load.

Referring to FIG. 1, there is shown a SEPIC converter 10 according to one embodiment of the invention. Inductor L1, indicator L2, capacitor C1, transistor Q1, transistor Q3 and associated body diode, and capacitor C5 form a classic SEPIC converter shown at 12. As the load on the converter 10 decreases, the voltage at the junction J1 of capacitor C1, inductor L1 and the drain of transistor Q3 tend to ring, as shown in the waveform diagram at 20 in FIG. 2 for a light load. Under a light load condition at output $V_{out}$, the first positive going pulse contains almost all of the transferable energy. The remaining pulses are low energy ringing.

According to this embodiment of the present invention, amplifier U1, diode D1, resistor R1, diode D2, resistor R2, resistor R6, resistor R10, resistor R11, capacitor C4 and transistor Q4 form a dual slope integrator shown at 14. The integrator 14 captures the gate on-time at control line 16, and then uses this gate on-time to capture the energy in the inductance of inductor L1. If transistor Q3 is turned on when the voltage at its drain is less than the voltage at its source, capacitor C5 discharges through inductor L1. When the gate drive to transistors Q1 transitions high, the output voltage at pin 1 of amplifier U1 moves in a positive direction. The gate drive voltage for transistor Q1 is also applied to the inverting input, pin 6, of amplifier U2. This gate drive voltage is always higher than the output of amplifier U1 due to the bias network formed by resistors R7, R8, R9 and diode D3, which forces the output of amplifier U2 to remain low while the non-inverting input to amplifier U2 is going in a positive direction, thus, insuring the transistor Q2 does not force transistor Q3 into an on condition.

The rising slope constant of integrator 14 is the product of capacitor C4, resistor R2 and diode D2. When the gate drive voltage at control line 16 transitions low, the descending slope constant at the amplifier U1 output is the product of capacitor C4, resistor R1 and diode D1. It is at this time that the voltage at the non-inverting input to amplifier U2, pin 7, is higher than the voltage at the inverting input, pin 6, of amplifier U2. This causes the output of amplifier U2, at pin 1, to move to a positive level that consequently causes transistor Q2 to conduct, thereby causing transistor Q3 to conduct, thereby transferring the energy at inductor L1 to the output capacitor C5. When the integrator 14 output, the output of amplifier U1, descends below the voltage level at the inverting input of amplifier U2 the output of amplifier U2 returns to a low level, thereby causing transistor Q2, and subsequently transistor Q3, to stop conducting.

Resistors R6, R10 and R11 form a voltage divider such that integration of integrator 14 follows the gate drive voltage at 16. The alternate paths for integrating "up" verses integrating "down" allow different timing for each direction of the integrator 14 to accommodate duty cycle, or timing, differences.

Capacitor C6 and resistor R14 form a differentiation circuit, where the positive pulse created when the gate transitions high briefly turns on transistor Q4 to eliminate integration wind up. Diode D5 clips the negative going portion of the differentiated pulse.

When circuit 10 operates at high load conditions, where the duty cycle at gate drive 16 is such that capacitor C4 would never completely discharge and, as such, would eventually reach positive saturation keeping transistors Q2 and Q3 in a state of constant conduction, the non-inverting input to amplifiers U2 is biased by transistor Q4 to keep the output of circuit 10 low when the gate drive voltage is high. The non-inverting input to amplifier U2 is also biased when the output of the integrator 14 has descended below the voltage level at the non-inverting input of amplifier U2 when the gate drive voltage is low.

In this manner, transistor Q3 is advantageously controlled to conduct for a period equal to, or slightly less than, the "on" period required to transfer the output energy stored in inductor L1 and eliminate reverse conduction through transistor Q3 when the voltage at the junction of inductor L1, capacitor C1, and transistor Q3's drain is less then the voltage across capacitor C5. The arrangement of the forward biased body diode of transistor Q3 provides a means of charging capacitor C5 before the voltage across capacitor C5 is sufficient to support the drive circuitry for transistors Q2 and Q3, and advantageously avoids contending with the ripple voltage at the source of transistor Q3. Advantageously, in this manner, good Vgs across transistor Q3 is maintained. In addition, any small amount of energy remaining in inductor L1 during the ringing is captured.

EXAMPLE

When using the circuit 10 in a typical application, such as a 100 Watt inverter, the output current, at an output voltage equal to 15 volts, is about 6.66 amps. Using 1.0 volt as a typical forward drop for power diodes, the losses are:

6.66 (amps)*1.0(volt)*0.65 (Duty Cycle)=4.33 watts.

Using a 75.0 volt Vdss, 0.0063Ω Rdson MOSFET transistor, the power losses are:

$(6.66)^2$ amps*$0.011\Omega$ (Rdson hot)*0.65 (Duty cycle) =0.317 watts.

Use of the circuit 10 realizes a 21 times reduction in conductive losses. In addition, switching losses are minimized with the body diode oriented in the direction shown. The maximum voltage across the body diode is 1.0 volts so the transistor Q3 switches when the Vds is at a minimum.

6.66 (amps)*1.0 (volt)*25 nsec*50,000 Hz*2=0.02 watts.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A power converter comprising:
   a SEPIC power converter circuit having an input adapted to receive an input signal and providing an output signal at an output, the circuit having a duty cycle, and further comprising a synchronous rectifier responsive to changes in the duty cycle, wherein the synchronous rectifier comprises a dual slope integrator.

2. The power converter of claim 1, wherein the synchronous rectifier reduces ringing in the output signal when the converter changes from a continuous mode to a discontinuous mode, and back.

3. The power converter of claim 2, wherein a frequency of the ringing decreases as a load applied to the output decreases.

4. The power converter of claim 1, wherein the synchronous rectifier provides a reduction in conductive losses in the converter circuit.

5. The power converter of claim 1, wherein the integrator includes an inductor capturing energy.

6. The power converter of claim 5, wherein the integrator is controlled by a gate, and captures an on-time of the gate.

* * * * *